US011735059B2

(12) United States Patent
Cox et al.

(10) Patent No.: US 11,735,059 B2
(45) Date of Patent: Aug. 22, 2023

(54) AIRCRAFT GROUND TRAVEL MONITORING SYSTEM WITH INTEGRATED COCKPIT HEAD-UP DISPLAY SYSTEM

(71) Applicant: Borealis Technical Limited, North Plains, OR (US)

(72) Inventors: Isaiah W. Cox, London (GB); Joseph J. Cox, Portland, OR (US); Jan Vana, Prague (CZ); Tomas Vana, Prague (CZ)

(73) Assignee: Borealis Technical Limited

( * ) Notice: Subject to any disclaimer, the term of this patent is extended or adjusted under 35 U.S.C. 154(b) by 165 days.

(21) Appl. No.: 17/170,534

(22) Filed: Feb. 8, 2021

(65) Prior Publication Data
US 2021/0248914 A1  Aug. 12, 2021

Related U.S. Application Data

(60) Provisional application No. 62/975,658, filed on Feb. 12, 2020.

(51) Int. Cl.
*G08G 5/06* (2006.01)
*B64D 47/08* (2006.01)
*G08G 5/00* (2006.01)
*G06V 20/20* (2022.01)

(52) U.S. Cl.
CPC ............ *G08G 5/065* (2013.01); *B64D 47/08* (2013.01); *G06V 20/20* (2022.01); *G08G 5/0021* (2013.01)

(58) Field of Classification Search
CPC ........ G06F 3/012; G06V 20/20; G06V 20/56; G08G 5/065; G08G 5/0021; G08G 5/045; B64D 47/08; B64D 43/00; B64D 2205/00; Y02T 50/80; B64C 25/405; B64F 1/002;

(Continued)

(56) References Cited

U.S. PATENT DOCUMENTS

| 7,737,867 | B2 | 6/2010 | Arthur et al. |
| 8,125,352 | B2 | 2/2012 | Dubourg et al. |
| 9,568,735 | B2 | 2/2017 | Park et al. |

(Continued)

OTHER PUBLICATIONS

Arthur, J.J. et al, Review of head-worn displays for the Next Generation Air Transportation System,vol. 56(5),May 2017, pp. 051405-1-11, Optical Engineering.SPIEDigtalLibrary.org.

(Continued)

*Primary Examiner* — Shon G Foley (57) ABSTRACT

A system and method are provided that direct a real time global view with images of an aircraft's entire exterior environment from an external monitoring system located on an aircraft equipped with landing gear wheel-mounted electric taxi drive systems powering ground travel to an integrated head-up display worn by a pilot driving the aircraft with the electric taxi drive systems within an airport ramp area. The real time global view and images produced by the monitoring system are communicated to the integrated head-up display in the form of an actual picture of the ramp area environment exterior to the aircraft viewable by the pilot with the head-up display in real time as the pilot maneuvers the aircraft within the ramp area with the electric taxi systems. The pilot can change the images viewed in the head-up display by changing head position.

11 Claims, 3 Drawing Sheets

(58) Field of Classification Search
CPC ............... G02B 27/00; G02B 27/0093; G02B 2027/0141; G02B 2027/0181; G06K 9/00
See application file for complete search history.

(56) References Cited

U.S. PATENT DOCUMENTS

| | | | | |
|---|---|---|---|---|
| 9,728,006 | B2 | 8/2017 | Varga | |
| 9,751,621 | B2* | 9/2017 | Cox | B64C 25/405 |
| 2007/0067093 | A1* | 3/2007 | Pepitone | G05D 1/0083 |
| | | | | 701/120 |
| 2007/0241936 | A1* | 10/2007 | Arthur | G08G 5/0021 |
| | | | | 359/13 |
| 2012/0139817 | A1 | 6/2012 | Freeman | |
| 2013/0162632 | A1* | 6/2013 | Varga | H04N 13/383 |
| | | | | 345/419 |
| 2013/0300649 | A1 | 11/2013 | Parkinson et al. | |
| 2016/0351061 | A1* | 12/2016 | Lamkin | G08G 5/0021 |
| 2018/0249085 | A1* | 8/2018 | Ozawa | G02B 27/017 |

OTHER PUBLICATIONS

Bellamy, W, Aviation Today, Oct. 29, 2019, https://www.aviationtoday.com/2019/10/29/business-jet-pilots-ready-wearable-head-display/.

Chinta, Pavan, Low Cost Wearable Head-Up Display for Light General Aviation, Embry-Riddle Aeronautical University, Dec. 2017.

* cited by examiner

AIRCRAFT GROUND TRAVEL MONITORING SYSTEM WITH INTEGRATED COCKPIT HEAD-UP DISPLAY SYSTEM

PRIORITY CLAIM

This application claims priority from U.S. Provisional Patent Application No. 62/975,658, filed 12 Feb. 2020, the entire disclosure of which is fully incorporated herein in its entirety.

TECHNICAL FIELD

The present invention is directed generally to ground movement monitoring systems for aircraft and specifically to a ground travel monitoring system for aircraft driven by electric taxi drive systems integrated with a cockpit head up display system.

BACKGROUND OF THE INVENTION

Systems for monitoring the ground travel of aircraft driven by landing gear wheel-mounted electric taxi drive systems without operation of aircraft engines or tow vehicles are being developed to enhance the safety and efficiency with which these aircraft may be driven. Systems for driving an aircraft on the ground during taxi with pilot-controlled landing gear wheel-mounted electric taxi drive systems without reliance on operation of the aircraft's main engines or the use of tow vehicles have been proposed by Applicant and others. As the pilot controls operation of electric taxi drive systems to maneuver an aircraft independently of engines and tugs during ground travel, especially within airport ramp areas, pilot situational awareness may be increased compared to when aircraft are driven with operating engines.

Ramp areas at today's airport terminals can be very congested places. Multiple aircraft are simultaneously arriving and departing, ground-based service vehicles and personnel are servicing parked aircraft, and ground crews are directing the arriving and departing aircraft into and out of gates. In addition, entrances and exits between taxiways and these congested ramp areas may themselves become congested as aircraft move into and out of ramp areas to park and transfer passengers and cargo. The avoidance of collisions and adverse incidents in these areas requires careful monitoring and control of the locations and movements of all aircraft, ground service vehicles, equipment, and personnel as arriving and departing aircraft are maneuvered within the ramps. At the present time, whether arriving aircraft are maneuvering into a parking location or departing aircraft are being pushed back, ground crews guide the moving aircraft, largely because the pilot and flight crew are not able to see the entire ground environment surrounding the aircraft. In particular, the sides and rear of the aircraft exterior, from the ground surface to above the wings, are not visible to the pilot and flight crew from the cockpit. The use of cameras and sensors mounted on exterior locations on aircraft has been helpful. However, despite the availability of these devices, incidents involving collisions involving moving aircraft during ground maneuvers within an airport ramp area still occur all too frequently. Additional monitoring of the ground level environment external to the portions of the aircraft not readily visible to the pilot or crew driving the aircraft, however, would improve pilot situational awareness, avoid potential collisions, and enhance safe operation of the aircraft as they are driven with the landing gear wheel-mounted electric taxi drive systems into and out of congested airport ramp areas.

Further improvements to pilot situational awareness as pilots drive aircraft equipped with landing gear wheel-mounted electric taxi drive systems and ground movement monitoring systems within airport ramp areas have not been specifically addressed in the art. Currently, out the window visibility is relied upon to provide the best view of aircraft surface operations, and it is preferred that at least one pilot and preferably two pilots are always facing head-out during aircraft surface operations, including during ground travel in ramp areas. A pilot's out-the-window view may provide views of many surface operations; that view, however, is limited primarily to the portion of the aircraft's exterior environment directly in front of the aircraft. While such a limited view may enable safe taxi on a runway where taxiing aircraft must maintain separation distances, driving an aircraft safely within a crowded airport ramp area where multiple aircraft, ground vehicles, and personnel are moving during aircraft arrivals and departures requires a more extensive view of an aircraft's exterior environment. Advantageously, this more extensive exterior view of the aircraft exterior environment should be readily available or easily accessed by aircraft pilots without requiring additional equipment.

Helmet-mounted displays and head-worn displays have been used in military applications since at least the 1980s and, more recently, have been proposed for nonmilitary aircraft. The United States Federal Aviation Administration (FAA) requires head-worn displays or head-up displays worn by a pilot to give the pilot a sufficiently extensive, clear, and undistorted view so that the pilot is able to safely perform maneuvers including taxi, takeoff, approach, and landing. A study of the use of wearable helmet-mounted displays and head-worn displays that may be worn by pilots of commercial aircraft by the United States National Aeronautics and Space Administration (NASA) using a high fidelity simulator suggests that some these devices may serve as an equivalent head-up display and are viable for commercial and business aircraft, primarily to assist with taxi route awareness, traffic awareness, taxi efficiency, and runway incursion prevention. The use of the foregoing displays by pilots was restricted to their use on runways, and the use of these wearable helmet-mounted and head-worn displays by pilots of commercial or business aircraft during ground maneuvers or surface operations within airport ramp areas or in connection with aircraft ground travel monitoring or like technology was not considered.

A need exists for an aircraft exterior environment monitoring system that integrates a pilot-wearable head-mounted or head-up display to provide a real time global or panoramic view of the aircraft's actual exterior environment not visible to the pilot directly to the pilot's head-up display as the pilot drives and maneuvers the aircraft within an airport ramp area.

SUMMARY OF THE INVENTION

It is a primary object of the present invention, therefore, to provide an aircraft exterior environment monitoring system that integrates a pilot-wearable head-mounted or head-up display to provide a real time global or panoramic view of the aircraft's actual exterior environment not visible to the pilot directly to the pilot's head-up display as the pilot drives and maneuvers the aircraft within an airport ramp area.

It is another object of the present invention to provide an aircraft ground movement monitoring system integrated with a pilot wearable head-up display that monitors ground travel maneuvers of aircraft equipped with landing gear wheel-mounted electric taxi drive systems to produce real time actual images of the aircraft exterior environment not visible to the pilot and to communicate the real time actual images to the pilot's head-up display as the pilot drives the aircraft with the electric taxi drive systems within an airport ramp area.

It is an additional object of the present invention to provide an aircraft ground movement monitoring system located exteriorly on an aircraft driven by electric taxi drive systems to obtain an actual panoramic view of an airport ramp area surrounding the aircraft that is communicated in real time directly or indirectly to an integrated head-up display worn by one or more pilots in a cockpit of the aircraft as the pilots maneuver the aircraft with the electric taxi drive systems within the airport ramp area in response to information provided by the real time actual panoramic view.

It is yet an additional object of the present invention to provide an aircraft ground movement monitoring system that produces a stream of actual real time images from monitoring devices to an integrated head-worn display operative to display different views of the images in response to head movement of the aircraft pilot wearing the display.

It is a further object to provide to a head-up display worn by a pilot driving an aircraft with an electric taxi drive system within an airport ramp area a precise global real time picture of the aircraft's entire external ramp environment produced by an aircraft's ground movement monitoring system integrated with the head-up display as the pilot maneuvers the aircraft with the electric taxi drive system within the ramp area.

In accordance with the aforesaid objects, a system and method are provided that direct a real time global view with images of an aircraft's entire external environment from an external monitoring system located on an aircraft equipped with landing gear wheel-mounted electric taxi drive systems to an integrated head-up display worn by a pilot maneuvering the aircraft with the electric taxi drive systems within an airport ramp area. The real time global view is produced by information obtained from the aircraft's ground movement monitoring system and communicated as a constant feed to the integrated head-up display to produce an actual picture of the ramp area exterior to the aircraft viewable by the pilot through the wearable head-up display in real time as the pilot drives and maneuvers the aircraft. The head-up display is operable to display different views in response to pilot head movements. Turning the pilot's head may change the displayed view of the aircraft exterior ramp environment. A single head-up display will provide the real time global view with images of the airport ramp area to a single pilot, and multiple head-up displays may provide real time global views and exterior aircraft ramp images to multiple pilots.

Other objects and advantages will be apparent from the following description, claims, and drawings.

DESCRIPTION OF THE INVENTION

The movement of aircraft into, out of, and within congested airport ramp areas while avoiding collisions and other adverse incidents is critical to maintaining the safety of all persons and vehicles in this portion of an airport. Monitoring the external ground travel environment of aircraft that are moving in these congested areas will help to prevent collisions between moving aircraft and other moving or stationary vehicles and personnel, significantly improving the safety and efficiency of airport airside and ramp ground operations. Monitoring systems may improve situational awareness as aircraft pilots and flight crew are driving an aircraft during ramp ground operations by providing a clear view of the spatial environment around the moving aircraft from the cockpit. The improved situational awareness provided by the present invention enables the pilot or crew to control the aircraft's electric taxi drive system more quickly than has been possible so that collisions between adjacent aircraft and between aircraft and ground support equipment and other sources of potential ground collision incidents may be avoided and prevented.

The terms "ramp" or "ramp area" will be used herein to refer to the airside area at an airport that is intended to accommodate aircraft for the loading and unloading of passengers, mail, cargo, fueling, parking, or maintenance and is synonymous with the term "apron," which is also used to identify this area at an airport.

"Electric taxi drive systems" refer to pilot-controllable systems used to drive aircraft without reliance on operation of aircraft engines and external tow vehicles and include electric drive motors mounted to drive nose or main landing gear wheels and activatable to drive and maneuver the aircraft during ground travel in response to pilot control. An example of an electric taxi drive system developed by Applicant to drive an aircraft during ground travel without reliance on operation of the aircraft's engines or attachment to external tow vehicles is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the integrated aircraft monitoring and pilot-wearable head-up display system of the present invention and are contemplated to be included within the terms "electric taxi drive systems."

The terms "wearable head-mounted display" and "wearable head-up display" as used herein refer generally to head mounted devices that may be worn by pilots while driving aircraft during ground travel with electric taxi drive systems and are integrated with the aircraft exterior monitoring system as described herein. Headsets currently worn by pilots of commercial aircraft typically include audio components such as earphones and microphones. Head-up displays useful with the present invention may include these elements and also include visual displays capable of producing actual real time out-the-window views and images transmitted from an aircraft exterior monitoring system, such as the monitoring system of the present invention. Head-mounted and head-up displays useful with the present invention do not rely on symbology or virtual and/or augmented reality features. Other features and capabilities of wearable head-mounted and head-up displays useful with the integrated system of the present invention are described and discussed below.

The ground movement and travel path of aircraft driven into, within, and out of an airport ramp area is currently monitored and directed by a combination of information available to the pilot and flight crew. This information may range from what the pilot and crew are able to view and observe directly from the cockpit windows, from information communicated by sensors attached to the aircraft exterior to the cockpit, from audio and/or visual communications from ground personnel to the cockpit, and from ground control and air traffic control communications. There are portions of the aircraft exterior and the spatial environment around the aircraft that are not visible from the cockpit window, for example from the ramp ground surface to above the aircraft wings. In addition, the pilot and crew do not have a clear, complete, and unobstructed line of sight from the aircraft nose to the tailskid during ground travel. Sensors, including proximity sensors, and video cameras mounted on an aircraft's wing tips and fuselage may help to communicate some kinds of information to the cockpit from these locations. When adverse weather or environmental conditions limit visibility around an aircraft moving into and within the ramp area, however, the usefulness of such sensors may also be very limited, and the presence of other aircraft, vehicles, and persons in the ramp area may not be detected or communicated to the cockpit. The integrated aircraft monitoring and cockpit wearable head-up display system of the present invention system of the present invention overcomes the foregoing limitations and provides an actual panoramic three-dimensional view of the ramp area exterior to the aircraft in real time to one or more wearable head-mounted or head-up displays in the aircraft cockpit.

Figure 1:
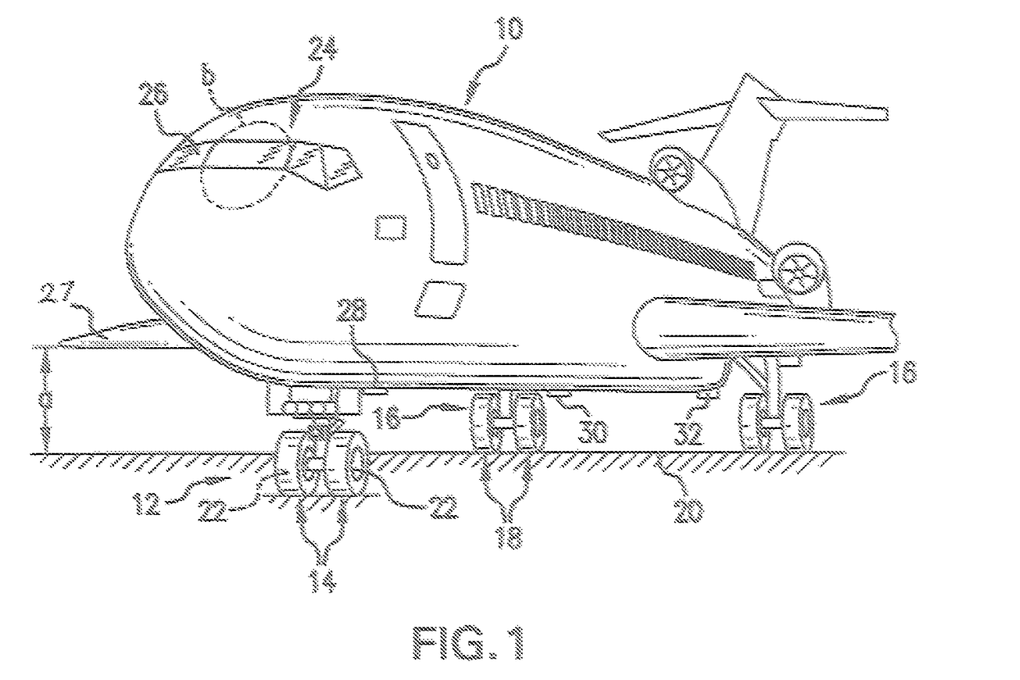
FIG. 1 shows an aircraft equipped with landing gear wheel-mounted electric taxi drive systems to power ground movement and an external monitoring system that provides a panoramic or global view of the aircraft exterior and the aircraft external ground level environment.

Referring to the Drawings, FIG. 1 illustrates, from a front and side perspective, an aircraft 10 equipped with the aircraft ground travel monitoring and integrated cockpit wearable head-up display system of the present invention of the present invention. The aircraft 10 has a nose landing gear 12 with a pair of tire-supporting wheels 14 and a pair of main landing gears 16, each with a pair of tire-supporting wheels 18 and is shown on a ground surface 20 in an airport ramp area. The aircraft 10 is equipped with pilot-controllable electric taxi drive systems that power aircraft ground movement without reliance on operating aircraft engines and connection to tow vehicles. Each nose landing gear wheel 14 may be equipped with an electric taxi drive system 22, including an electric drive motor assembly and system components (not shown) mounted within in the wheel volume of each nose landing gear wheel 14 mounted on the nose landing gear 12 of aircraft 10. One or more electric taxi drive systems may also or alternatively be mounted within one or more of the aircraft main landing gear wheels 18 on one or more main landing gears 16. The electric taxi drive systems may be controlled by pilots and/or crew of the aircraft from the cockpit 24 to drive an arriving aircraft into the ramp area, maneuver the aircraft within the ramp area into and out of a parking location that may or may not include a passenger loading bridge, and drive a departing aircraft out of the ramp area without operation of the aircraft's main engines or tow vehicles.

The pilot and/or crew driving the aircraft 10 on the ground with the electric taxi drive system, or in any other manner, has a view that is essentially limited to what can be seen directly out of the window 26 of the aircraft's cockpit 24. This limited view covers only a small portion of the aircraft's exterior and the ramp area environment surrounding the aircraft, primarily that forward of the aircraft. Consequently, as the aircraft 10 is driven into, within, and out of the ramp area, as discussed in connection with FIG. 4, the presence of other aircraft, ground vehicles, equipment, and personnel near all the portions of the aircraft's exterior that are not visible from the cockpit window 26 may pose collision and other hazard risks. While currently available video cameras and proximity sensors may help mitigate some collision risks as aircraft are moved on the ground, video cameras are presently capable of monitoring only a relatively limited ground space around an aircraft. Such systems do not function equally effectively in all weather and environmental conditions and do not provide a line of sight from the aircraft nose to the tailskid to the pilot and crew in the aircraft cockpit. The majority of potential collision or other hazard risks in the external ramp environment of aircraft 10 as it moves within the ramp area are likely to be within a volume or space surrounding the aircraft extending from the ground surface 20 to just above the aircraft's wings 27, the approximate vertical distance indicated by the arrow α in FIG. 1.

Applicant has proposed an improved monitoring system for electric taxi drive system-driven aircraft in connection with an aircraft ground collision avoidance system in commonly owned co-pending U.S. Patent Application Publication No. US 2020/0027,363, the entire disclosure of which is fully incorporated herein by reference. This system mounts scanning LiDAR devices on aircraft structures in exterior locations that will produce a panoramic three-dimensional point of view during aircraft ground travel and that will also not interfere with the aircraft's aerodynamic profile during flight. The monitoring devices and potential exterior aircraft locations for these monitoring devices described in this patent application publication may be employed in connection with the present aircraft ground travel monitoring and integrated cockpit wearable head-up display system. Exterior aircraft locations selected for monitoring devices, whether scanning LiDAR or other scanning devices, should scan areas or spaces external to an aircraft to produce actual global or panoramic images of the scanned areas or spaces that may be transmitted to a pilot's wearable head-up display in real time as the pilot is driving the aircraft with the electric taxi drive systems so that the pilot sees an actual picture of what the monitoring device sees.

Scanning monitoring devices may be positioned in as many locations on the exterior of the aircraft 10 as necessary to provide an actual panoramic view of the ramp environment external to the aircraft as the pilot drives and maneuvers the aircraft in the ramp area. By way of illustration, scanning devices 28 and 30 may be located just aft of the nose landing gear 12, and/or just aft of the main landing gears 16 on the exterior of the aircraft fuselage. An additional location for a scanning device 32 may be under the aircraft tailskid. Advantageously, configurations of surface mounted scanning devices are aerodynamic and do not interfere with aircraft's slipstream in flight or may be extendible from and retractable into the fuselage so that they are extended during aircraft ground movement and then retracted during flight. While multiple scanning devices may provide a more complete panoramic or global view and image of the ramp environment as the aircraft equipped with these devices is driven in a congested ramp area with electric taxi drive systems, in some situations a single scanning device, particularly a single scanning LiDAR device, may also generate a view that will enable the pilot to safely maneuver the aircraft in the congested ramp area. Additional or alternative locations for one or more scanning devices are contemplated to be positioned on nose and main landing gear structures so that they do not interfere with the extension and retraction of the landing gear or with other landing gear functions. It is further contemplated that scanning devices operable to obtain actual real time images of an aircraft's external ground environment as the aircraft is driven within a ramp area may be positioned in other locations than those shown in FIG. 1.

Figure 2:
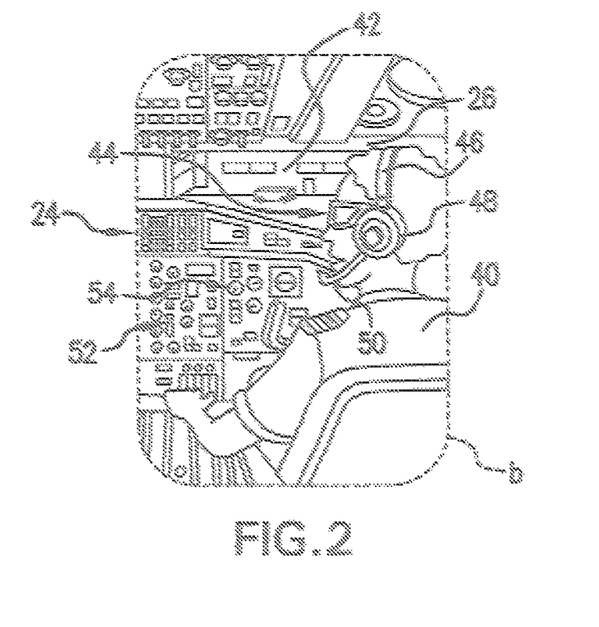
FIG. 2 shows a pilot in the cockpit of the aircraft of FIG. 1 wearing the head-up display integrated with the aircraft monitoring system of the present invention and driving the airport in an airport ramp area with the landing gear wheel-mounted electric taxi drive systems.

Advantageously, actual images of the ramp environment outside the aircraft as it is driven with electric taxi drive systems into, within, and out of the ramp area produced by the scanning monitoring devices may be transmitted in real time directly or indirectly or as a constant feed to one or more head-up displays worn by one or more pilots in the aircraft cockpit. FIG. 2 shows a portion of the cockpit 24, represented by the dashed line circle b, from the view of a pilot 40 driving the aircraft of FIG. 1 in an airport ramp area and wearing a head-up display integrated with the aircraft monitoring system described above. As noted, head-mounted devices have been worn by aircraft pilots for many years, and, while helmet-mounted head-worn displays are routinely used by military pilots, forms of head-worn displays likely to be acceptable for use by pilots of commercial and business aircraft have only recently become technologically feasible. Head-worn devices that enable head-up displays are required by the FAA to give pilots a sufficiently extensive, clear, and undistorted view to enable them to safely perform any maneuvers within the operating limitations of the aircraft, including taxiing, takeoff, approach, and landing. (14 CFR 25.773) In addition, a head-up display or head-worn display may augment the prevailing visibility and provide sufficient information to enhance or enable an operation without significantly obscuring visibility. Available and proposed head-worn and head-up displays, however, typically are optoelectronic devices that employ augmented reality and symbology and virtual environments, rather than actual aircraft external environments during aircraft surface operations on runways and taxiways. Providing an actual real time image of an aircraft's exterior environment as the aircraft maneuvers within an airport ramp area does not appear to have been considered.

In FIG. 2, the pilot 40 is seated in the cockpit 24 of an aircraft 10 equipped with nose landing gear wheel-mounted electric taxi drive systems that are controllable to power aircraft ground travel as the aircraft is driven and maneuvered within an airport ramp area. A portion of an airport terminal building 42 is visible through the window 26 of the cockpit 24. Although not visible through the cockpit window 26, the pilot's out-the-window view may also include other aircraft, ground vehicles, and ground crew personnel located within the limited range of view that can be seen through the cockpit window. Additional aircraft, vehicles, and personnel may be present in the aircraft's exterior ramp environment, but may not be visible within the pilot's out-the-window view, however. The pilot 40 is wearing a head-up display 44 that may be a part of a standard headset 46 that includes earphones 48 and a microphone 50. Other configurations of head-up displays have been proposed, including that shown in FIG. 3, and it is contemplated that the head-up display may take a different form from what is shown in the drawings. Among the controls 52 in the cockpit are pilot-operable controls 54 that control operation of the electric taxi drive systems and aircraft ground movement. It is contemplated that a constant feed of the actual global or panoramic real time images produced by the monitoring devices will be transmitted to the head-up display 44 and that the pilot can turn her head to show different views.

Figure 3:
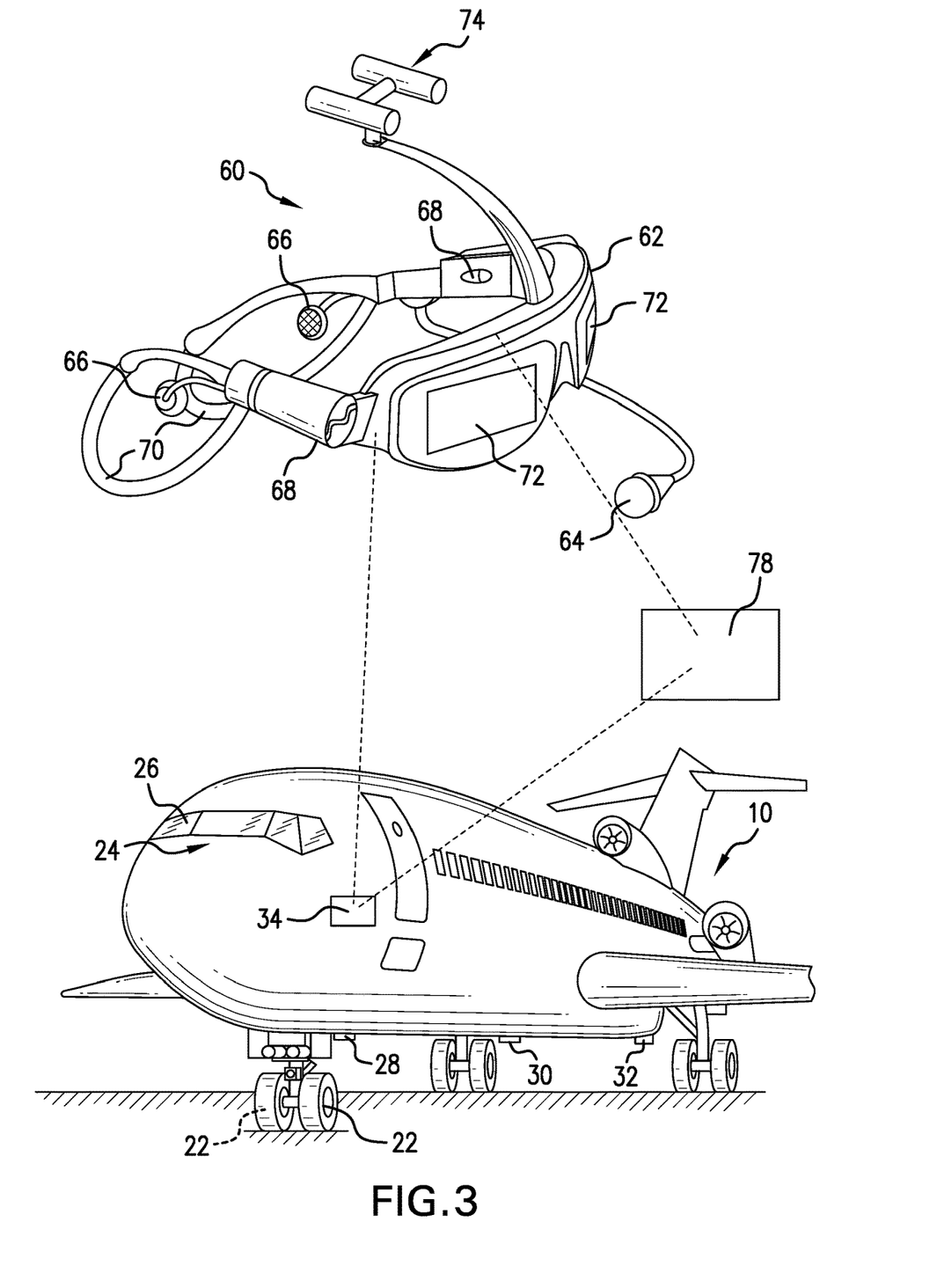
FIG. 3 is a diagrammatic representation of the aircraft external ground travel environment monitoring system and integrated wearable head-up display system of the present invention.

FIG. 3 illustrates integration of the aircraft monitoring system with an example of a head-up display 60, which has a different configuration from the head-up display 44 shown in FIG. 2. The aircraft 10 has a ground travel monitoring system with multiple scanning monitors or a single scanning monitor as described in connection with FIG. 1. This exemplary head-up display 60, which may be used by pilots during aircraft flight and by military and civilian air traffic control personnel from control towers to guide aircraft fight and landing paths, as well as in different vehicle and other applications, is described in U.S. Pat. No. 9,728,006, the disclosure of which is fully incorporated herein in its entirety by reference. The head-up display 60 is based on a pair of projection type glasses 62 and may include a microphone 64, earphones 66, head orientation sensors 68, and a vestibular interface 70. See-through display surfaces 72 are provided in front of the wearer's eyes. A space sensor system 74, which may be a gimbaled zoomable stereo camera system is mounted to the projection glasses to provide images to the display surfaces 72. This particular head-up display is capable of augmenting data from the space sensor system or camera 74 with real time information from a range of different sensors to produce a virtual three-dimensional orthogonal space on the display from other data. Not all of these elements may be needed in a head-up display designed to be integrated with and to receive information from an aircraft monitoring system, as described herein. It is contemplated that a head-up display, like the head-up display 60, may be adapted to provide the real time global views and images of the airport ramp area from the monitoring system to a pilot wearing the head-up display. The head-up display may be further adapted to be responsive to the wearer's head movements and to enable the pilot 40 to change the view by moving her head.

In the integrated aircraft monitoring and head-up display system of the present invention, actual real time images of the ramp environment external to the aircraft 10 as it is driven within the ramp area by the electric taxi drive systems 22 are obtained by the aircraft-mounted scanning monitoring devices 28, 30, and 32, and these images are transmitted to a processor on the aircraft, represented schematically at 34. The processed images, which advantageously provide an actual panoramic view of the entire aircraft exterior environment in real time, may then be directly transmitted to the head-up display 44 (FIG. 2) or 60 (FIG. 3) to display the actual panoramic real time views to the pilot. Alternatively, or in addition, the images from the scanning monitoring devices 28, 30, and 32 may be transmitted to an external processor 78, and the processed images may be transmitted from the external processor 78 to the head-up display 44 or 60. The actual global or panoramic real time images may also be transmitted directly to the head-up display, advantageously in the form of a continuous feed. As noted above, the head-up display 44 or 60 should be responsive to head movements, and the pilot's head may be turned to show different views of the images. This should provide a more comprehensive view of the exterior ramp area environment surrounding the aircraft as the pilot maneuvers the aircraft within the ramp with the electric taxi systems.

Figure 4:
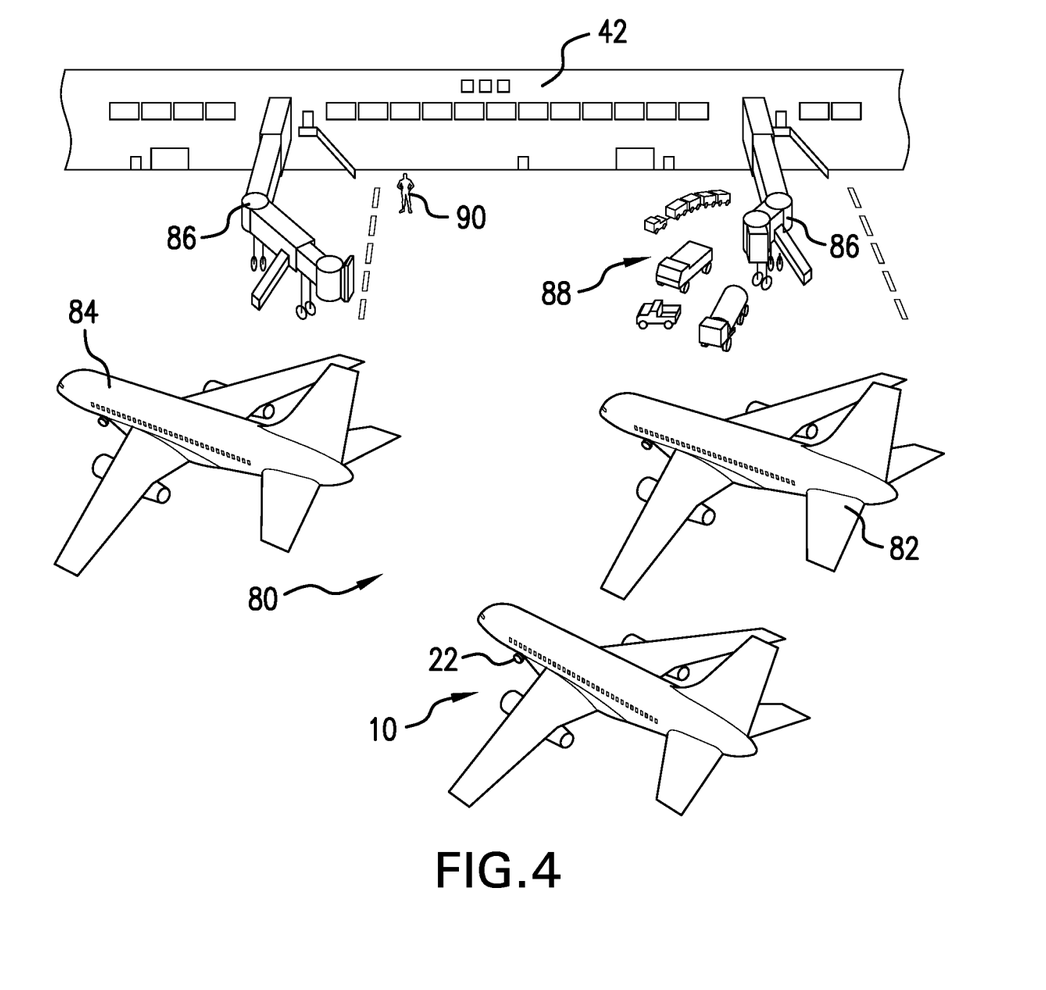
FIG. 4 illustrates an airport ramp area on the airside of an airport terminal building and shows aircraft equipped with the exterior ground travel environment monitoring system of FIG. 1 and landing gear wheel-mounted electric taxi drive systems maneuvering with the electric taxi drive systems during ground travel within the ramp area.

FIG. 4 shows the aircraft 10 of FIG. 1 driven with the electric taxi drive systems 22 by the pilot 40 into an airport ramp area 80. Two additional aircraft 82 and 84 are also moving within the ramp area 80. In addition to the three aircraft, there may be passenger loading bridges 86, ground service vehicles 88, and ground service personnel 90 in the portion of the ramp 80 adjacent to the airport terminal building 42, such as those shown in FIG. 4. Each or all of these vehicles, structures, and personnel, as well as other vehicles and structures that may typically be present in an airport ramp area but are not shown in FIG. 4, pose potential collision or adverse incident risks. Driving aircraft with electric taxi drive systems instead of with operating aircraft main engines provides enhanced pilot situation awareness and eliminates adverse incidents associated with jet blast and engine ingestions. The potential for collisions with other aircraft, ground service vehicles, and ground crew personnel, while significantly reduced, may not be completely eliminated.

As noted above, pilot and flight crew views out of the window from the aircraft cockpit are limited, and only a relatively small volume of space around the nose of the aircraft may be actually visible to the pilot out of the cockpit window. When aircraft are equipped with single or multiple scanning ground travel monitor devices positioned in locations on the aircraft exterior to obtain real time actual panoramic or global images of portions of the aircraft exterior not otherwise visible to the pilot driving the aircraft and these images are transmitted to an integrated head-up display and are immediately available to the pilot, the pilot can quickly take whatever action is required to avoid or prevent a collision or adverse incident. Advantageously, the pilot can control the electric taxi drive system to change the aircraft's travel path or stop the aircraft's ground travel, as necessary to maintain safety. When a pilot wears a head-up display as described herein, the pilot can continue to maintain a head up position while obtaining, on a continuous basis, the real time visual information required to continue driving the aircraft safely with the electric taxi drive systems and does not need to find or consult a cockpit display that would require a head down position to obtain this necessary information. The pilot may also change the views from the monitoring devices by changing head position.

As noted, more than one of the head-up displays described herein may be integrated with the aircraft ground travel monitoring system. When multiple head-up displays are provided and worn by multiple pilots, the system may be programmed to transmit the same or a different display to each of the multiple head-up displays. Transmission of the same display from the aircraft monitoring system would provide the same real time images to each pilot's head-up display and could provide dual confirmation of presence or absence of a potential collision or a ground incident that might impact safety of electric taxi drive system-powered aircraft ramp ground travel. The present system might also be programmed to transmit actual real time images from a different portion of the aircraft's exterior to each head-up display so that each pilot is responsible for communicating presence or absence of potential ground incidents observed in a specific portion of the aircraft's external environment to the other pilots. Such an approach can work with any type of aircraft and might be particularly helpful for large wide body aircraft.

The aircraft ground travel monitoring system with an integrated cockpit head-up display for aircraft driven during ramp operations with electric taxi drive systems described herein has been described with respect to preferred embodiments. Other, equivalent, systems and methods are also contemplated to be within the scope of the present invention.

INDUSTRIAL APPLICABILITY

The present aircraft ground travel monitoring system with integrated cockpit head-up display for aircraft driven during ramp operations with electric taxi drive systems will find its primary applicability in improving safety of airport ramp operations when aircraft equipped with ground travel monitoring systems and the integrated cockpit head-up displays are driven with electric taxi drive systems within airport ramp areas.

The invention claimed is:

1. An airport ramp area ground movement system for electric taxi drive system-equipped aircraft that integrates a pilot wearable head-up display system with an external aircraft monitoring system to enable pilots of the equipped aircraft to remain head up while safely maneuvering the aircraft with the electric taxi drive systems within the airport ramp area, comprising:
   a. a ramp area in an airside area of an airport structured to accommodate multiple arriving and departing aircraft, passenger loading bridges, ground service vehicles, and ground service personnel;
   b. aircraft equipped for pilot-controlled ground travel with landing gear wheel-mounted electric taxi drive systems driven within the ramp area by pilots controlling the electric taxi drive systems;
   c. one or more programmable pilot head-up display systems responsive to pilot head movements, each said pilot head-up display system comprising at least a wearable head-mounted element supporting a display element viewable by pilots wearing said head-up display systems located in cockpits of said equipped aircraft and responsive to changes in pilot head position and being programmable to receive identical or different displays of said actual real time three-dimensional panoramic images of said volume of ramp space directly from said integrated monitoring system and indirectly from said processing system;
   d. an equipped aircraft external monitoring system integrated with said one or more pilot head-up display systems comprising single or multiple scanning monitoring devices positioned in exterior surface locations on said equipped aircraft and operable to produce and transmit actual real time three-dimensional panoramic images of at least a volume of ramp space adjacent to said equipped aircraft extending from said ramp ground surface to just above wings of said equipped aircraft not visible to said pilots in said cockpits directly or indirectly to said programmable pilot head-up display systems, further comprising the single or multiple scanning monitoring devices positioned in equipped aircraft exterior surface locations to provide a view from a nose to a tailskid of the aircraft; and
   e. a processing system in communication with said one or more programmable pilot head-up display systems and with said integrated monitoring system to process and transmit said actual real time three-dimensional panoramic images of said volume of ramp space communicated to said processing system by said integrated monitoring system and then to transmit the processed actual real time three-dimensional panoramic images from the processing system to the pilot head-up display systems as the at least one pilot maintains the head-up position, views the processed real time three-dimensional panoramic images received from the processing system, and maneuvers the equipped aircraft through the ramp area in response to the viewed images to avoid collisions and adverse incidents, wherein said processing system comprises a processor located onboard said equipped aircraft in communication with said integrated monitoring system and with said one or more programmable pilot head-up display systems or a processor located offboard said equipped aircraft in communication with an onboard processor and with said one or more programmable pilot head-up display systems.

2. The system of claim 1, further comprising multiple ones of said programmable head-up display systems worn by multiple pilots in cockpits of said equipped aircraft, said display elements of said multiple programmable head-up display systems being programmed to receive a same or a different display of said actual real time three-dimensional panoramic images.

3. The system of claim 1, wherein said integrated monitoring system is operable to produce a continuous feed of said actual real time three-dimensional panoramic images from said single or multiple scanning monitoring devices for transmission to said display elements of one or more programmable pilot head-up display systems.

4. A method that enables pilots to maintain a head-up position and to safely maneuver aircraft equipped with pilot-controllable electric taxi drive systems without adverse incidents and collisions during ground travel within an airport ramp area, comprising:

a. at an airport having a ramp area in an airside area of the airport structured to accommodate multiple arriving and departing aircraft, passenger loading bridges, ground service vehicles, and ground service personnel, providing aircraft equipped for pilot-controlled ground travel with landing gear wheel-mounted electric taxi drive systems to maneuver the equipped aircraft within the ramp area;
   b. providing one or more programmable pilot head-up display systems responsive to pilot head movements, each pilot head-up display system comprising at least a wearable head-mounted element supporting a display element viewable by pilots wearing the head-up display systems located in cockpits of said equipped aircraft;
   c. providing an equipped aircraft external monitoring system integrated with the one or more programmable pilot head-up display systems comprising single or multiple scanning monitoring devices positioned in exterior surface locations on the equipped aircraft and operable to produce and transmit actual real time three-dimensional panoramic images of at least a volume of ramp space adjacent to the equipped aircraft extending from the ramp ground surface to just above wings of said equipped aircraft not visible to pilots in the cockpits, providing a processing system to receive the transmitted actual real time three-dimensional panoramic images in communication with the integrated monitoring system and with the pilot head-up display systems, and programming the pilot head-up display systems to receive and display the same or different ones of the actual real time three dimensional panoramic images communicated by the processing system or by the integrated monitoring system;
   d. controlling the electric taxi drive systems and maneuvering the equipped aircraft within the ramp area by at least one pilot in a head-up position wearing one of the programmable head-up display systems, transmitting the actual real time three-dimensional panoramic images of the volume of ramp space adjacent to the equipped aircraft to the programmable pilot head-up display systems directly from the integrated monitoring system or indirectly through the processing system;
   e. continuing to maneuver the equipped aircraft within the ramp area with the electric taxi drive systems by the pilot maintaining the head-up position, viewing, and changing views of the actual real time three-dimensional panoramic images of the volume of ramp space adjacent to the equipped aircraft viewed in the display elements in response to the pilot changing head position; and
   f. identifying potential adverse and collision incidents within the volume of ramp space in real time by the pilot from the actual real time three-dimensional panoramic images viewed in the display element, and controlling the ramp area ground travel of the equipped aircraft with the electric taxi drive systems to avoid or prevent an adverse or collision incident.

5. The method of claim 4, wherein said processing system comprises a processor located onboard said equipped aircraft in communication with said integrated monitoring system and with said one or more programmable pilot head-up display systems or a processor located offboard said equipped aircraft in communication with an onboard processor and with said one or more programmable pilot head-up display systems.

6. The method of claim 4, further comprising programming said one or more programmable pilot head-up display systems to receive on the display elements the same or different displays of said actual real time three-dimensional panoramic images of said volume of ramp space directly from said integrated monitoring system and indirectly from said processing system.

7. The method of claim 4, further comprising programming multiple programmable pilot head-up display systems in the cockpit of an equipped aircraft to receive identical displays of the actual real time three-dimensional panoramic images of the volume of ramp space from the integrated monitoring system or to receive different displays of the actual real time three-dimensional panoramic images of the volume of ramp space from different portions of the equipped aircraft exterior.

8. The method of claim 7, further comprising providing the programmed pilot head-up display systems to multiple pilots in the equipped aircraft cockpit, transmitting the actual real time three-dimensional panoramic images from the integrated monitoring system to the processing system and then to display elements on the more than one pilot head-up display systems, and displaying the identical ones or the different ones of the actual real time three-dimensional panoramic images on the display elements on the programmed pilot head-up display systems.

9. The method of claim 4, further comprising transmitting the actual real time three-dimensional panoramic images directly from the integrated monitoring system to the programmable pilot head-up display systems as the at least one pilot maintains the head-up position, views the actual real time three-dimensional panoramic images received from the aircraft integrated monitoring system, and maneuvers the equipped aircraft within the ramp area in response to the viewed images to avoid or prevent adverse or collision incidents.

10. The method of claim 4, further comprising transmitting the actual real time three-dimensional panoramic images from the integrated monitoring system to the processing system and then transmitting the processed real time three-dimensional panoramic images from the processing system to the pilot head-up display systems as the at least one pilot maintains the head-up position, views the processed real time three-dimensional panoramic images received from the processing system, and maneuvers the equipped aircraft through the ramp area in response to the viewed images to avoid collisions and adverse incidents.

11. The method of claim 4, wherein the single or multiple scanning monitoring devices of the integrated monitoring system comprise scanning cameras and scanning LiDAR devices and further comprising positioning the scanning monitoring devices to provide the actual real time three-dimensional panoramic images of views of the volume of ramp space adjacent to the equipped aircraft while the pilot maneuvers the equipped aircraft with the electric taxi drive systems through the ramp area in the head-up position and views the actual real time three-dimensional panoramic images in the programmable head-up display system display element.

\* \* \* \* \*